(12) United States Patent
Yehuda et al.

(10) Patent No.: US 7,058,056 B2
(45) Date of Patent: Jun. 6, 2006

(54) METHOD, DEVICE AND SYSTEM FOR DELAY EQUALIZING IN HIGH RATE DATA STREAMS

(75) Inventors: Eitan Yehuda, Zoran (IL); Eyal Shaked, Ganei Tikva (IL); Ilan Halevi, Petach Tikva (IL)

(73) Assignee: ECI Telecom Ltd., Petach Tikva (IL)

( * ) Notice: Subject to any disclaimer, the term of this patent is extended or adjusted under 35 U.S.C. 154(b) by 813 days.

(21) Appl. No.: 09/793,385

(22) Filed: Feb. 27, 2001

(65) Prior Publication Data

US 2002/0090009 A1    Jul. 11, 2002

(30) Foreign Application Priority Data

Feb. 27, 2000    (IL) .................................... 134743

(51) Int. Cl.
*H04L 12/56*    (2006.01)
(52) U.S. Cl. ..................................... 370/394; 370/536
(58) Field of Classification Search ............... 370/366, 370/394, 412, 413, 414, 415, 416, 417, 536
See application file for complete search history.

(56) References Cited

U.S. PATENT DOCUMENTS

| | | | |
|---|---|---|---|
| 4,769,815 A | | 9/1988 | Hinch et al. |
| 5,483,523 A | * | 1/1996 | Nederlof ..................... 370/394 |
| 5,777,988 A | | 7/1998 | Cisneros |
| 5,875,192 A | * | 2/1999 | Cam et al. ................ 370/395.7 |
| 5,987,030 A | * | 11/1999 | Brockhage et al. .......... 370/394 |
| 6,081,523 A | * | 6/2000 | Merchant et al. ........... 370/389 |
| 6,111,890 A | * | 8/2000 | Rao ........................... 370/462 |
| 6,160,819 A | * | 12/2000 | Partridge et al. ........... 370/474 |
| 6,222,858 B1 | * | 4/2001 | Counterman ................ 370/474 |
| 6,370,579 B1 | * | 4/2002 | Partridge .................... 709/226 |

FOREIGN PATENT DOCUMENTS

| | | | |
|---|---|---|---|
| EP | | 924954 A1 * | 6/1999 |
| WO | WO 9733398 A1 * | | 9/1997 |

OTHER PUBLICATIONS

International Telecommunication Union, (ITU-T), Series G: Transmission Systems and Media, Mar., 1996.
European Telecommunications Standards Institute, ETSI TM1/WP3/SDH, Sophia Antipolis, 23-26, (1998).

* cited by examiner

*Primary Examiner*—John Pezzlo
*Assistant Examiner*—Donald L Mills
(74) *Attorney, Agent, or Firm*—Browdy and Neimark, PLLC

(57) ABSTRACT

A method, a device and a system for delay equalizing of fragment data streams transmitted via N individual paths and forming a virtual data stream, wherein the virtual data stream and each of said fragment data streams consisting of data frames; the method including gradual minimization of differential delay of the fragment data streams at one or more intermediate points between a source point and a destination point of the virtual data stream. The gradual minimization of the differential delay can be provided by devices (30, 32) respectively fitted at the intermediate points; each of the devices comprises a control unit (36) and N memory buffer blocks (34), each associated with a respective individual path.

22 Claims, 5 Drawing Sheets

METHOD, DEVICE AND SYSTEM FOR DELAY EQUALIZING IN HIGH RATE DATA STREAMS

FIELD OF THE INVENTION

The present invention relates to a method for supporting a high rate data stream which is divided into a number of lower rate fragments to be transmitted individually via parallel paths according to a so-called Inverse Multiplexing technology. More particularly, the invention concerns minimizing delay differences between such fragments, and specifically deals with delay equalizing for a virtual concatenated data stream before converting it into a contiguous concatenated stream in telecommunication systems of SONET/SDH.

BACKGROUND OF THE INVENTION

The Synchronous Digital Hierarchy (SDH) and its North-American equivalent, the Synchronous Optical Network (SONET), are the globally accepted, closely related and compatible standards for data transmission in the public wide area network (WAN) domain. Recently, SDH/SONET has also been adopted by the ATM Forum as a recommended physical-layer transmission technology for ATM (Asynchronous Transfer Mode) network interfaces.

SONET and SDH govern interface parameters; rates, formats and multiplexing methods; operations, administration, maintenance and provisioning for high-speed signal transmission. SONET is primarily a set of North American standards with a fundamental transport rate beginning at approximately 52 Mb/s (i.e., 51.84 Mb/s), while SDH, principally used in Europe and Asia, defines a basic rate near 155 Mb/s (to be precise, 51.84×3=155.52 Mb/s). From a transmission perspective, together they provide an international basis for supporting both existing and new services in the developed and developing countries.

For transmitting data, SDH and SONET use frame formats transmitted every 125 µs (8000 frames/s). Because of compatibility between SDH and SONET, their basic frames are similarly structured, but differ in dimension, which fact reflects the basic transmission rates of 155.52 and 51.84 Mb/s, respectively. To be more specific, a basic frame format of SDH is 9 rows of 270 bytes, or 2430 bits/frame, corresponding to an aggregate frame rate of 155.52 Mb/s. For SDH systems, the mentioned basic frame transmitted at the rate 155.52 Mb/s forms the fundamental building block called Synchronous Transport Module Level-1 (STM-1 which, according to SDH mapping scheme, contains a signal called AU-4 which, in turn, carries a signal VC-4). For SONET systems, the basic frame has dimensions of 9 rows by 90 bytes (270.3) and, being transmitted at the rate 51.84 Mb/s (155.52:3), forms the appropriate fundamental building block called Synchronous Transport Signal Level-1 (STS-1 containing AU-3 that carries a signal VC-3).

Each basic frame of SONET or SDH comprises an information portion called Information Payload and a service portion called Overhead (OH). Information payload is usually formed by virtual container signals VC4, VC3 and the like, and comprise a so-called POH (Path Overhead) portion predestined for various service and control functions.

SDH comprises also signals of Synchronous Transport Level 4, 16 and 64, which constitute 4, 16 or 64 independent VC4 signals. An analogous arrangement exists in SONET (signals STS1, STS3, STS12, STS48 etc.)

SDH and SONET are known to support data streams having rates higher than the fundamental building block. If there are services requiring a capacity greater than 155 Mbps, one needs a vehicle to transport the payloads of these services. In SDH, so-called concatenated signals, for example VC4-Nc, are designed for this purpose. STM-4 signal having a data rate 622.08 Mb/s (4×155.52 Mb/s) is one of the high order signals in the SDH system. Payload of the STM-4 signal is generated by byte-interleavingly multiplexing four payloads of STM-1 (or four AU4, or four VC4) signals. Concatenated VC4 (VC4-Nc) is characterized by a common synchronous payload envelope being N-fold VC4-s, and by a common POH. Concatenated signals can be transmitted over a network in a number of ways.

So-called contiguous concatenation means that the high rate signal is transmitted as a continuous stream over a single path; in that case the signal's combined payload is sent in one synchronous payload envelope (SPE) having a common POH column in the standard frame.

Another option of transmitting a concatenated signal is dividing it into a number of fragments and transmitting them in parallel via respective channels, for further assembling at the destination point. Such a technology is generally known as a so-called Inverse Multiplexing (Inverse-MUX technology), which is applied when a suitable data channel is not available for a high rate data signal. Inverse Multiplexing is in use, for example, for PDH and ATM signal transmitting. In one particular implementation, one PDH signal of 10 MHz can be divided into five "fragment" signals of 2 MHz transmitted via respective five parallel paths; likewise, it may be divided into 3 individually transmitted signals of 2 MHz and 4 parallel fragments of 1 MHz each.

In SDH/SONET, the high rate contiguous concatenated stream is transformed into a so-called virtual concatenated signal by disassembling the contiguous signal and transmitting its lower rates fragments along respective parallel paths. For example, for transmitting VC4-4c, it is disassembled into four VC4 signals, which are transmitted via four individual paths, wherein the VC4 signal is considered a fragment. At the destination point, the fragments must be re-assembled to form the initial contiguous concatenated signal. This option is proposed in an ITU-T Standard Recommendation G.707 for transmission of concatenated signals over telecommunication networks. Of course, the fragments must be frame-aligned prior to re-assembling and the efficiency of transmission wholly depends on the proper synchronizing.

Therefore, a problem arises how to synchronize the transmission of fragments of the disassembled concatenated stream via different paths that usually have different delays. Moreover, the delays may change. Reasons for the delay fluctuations may be a newly introduced or removed network element, etc.

Indeed, when the fragments arrive to the point of re-assembling, the delay difference there-between may become so great and/or disordered that it will prevent the proper restoration of the initial stream.

A method is presently discussed in various Standard Committees of how to handle the above problem at the point of re-assembling. (For example, a contribution ETSI TM1/WP3/SDH of Nortel Networks submitted for discussion at Sophia Antipolis on 23–26 Nov. 1998).

The solutions presently discussed are based on providing a number of buffer memory blocks situated at equipment of the destination point (say, four blocks in the case of VC4-4c transmitted via four parallel. paths). In the case of VC4-4c, each of the four memory blocks is assigned to a respective fragment of the concatenated stream; let VC4 fragments of the concatenated data stream are designated as A, B, C and D streams. When these VC4 fragments, initially belonging to one concatenated VC4-4c signal, arrive to the respective buffer memory blocks at the destination point, they usually demonstrate a delay difference which did not exist at the time of their simultaneous "launching".

It should be noted that data frames in any fragment (A, B, C or D) are arranged in multiframes, each multiframe comprising a particular number of frames. Each frame in the multiframe has its serial number indicated in the overhead portion of the frame (POH of VC4). The device at the destination point, receiving the individually coming fragments (VC4 streams) online, will be capable of proper aligning and reassembling them into the initial synchronous envelope only when their inter-relationship can still be correctly restored. It is good if the delay conditions of different parallel paths are more or less the same, and the fragments' streams arrive to the device quite "close" to one another from the point of their frame number in the multiframe. For example, the beginning of frame No. 1 in the first multiframe of fragment A arrives with a particular delay relative to the beginning of frame No. 1 in the first multiframe of fragment B, while the beginning of frames No. 1 in the first multiframes in fragments C and D arrive simultaneously but much earlier than those of stream B. The assumption is made that the maximal delay difference does not exceed a half of one multiframe, thus the buffer blocks of fragments A,B,C and D at the destination point deal simultaneously with frames belonging to multiframes which were sincronously launched at the source point. To support considerable delay differences, longer multiframes may be formed. The longer the expected delay, the greater the buffer which should be installed at the destination point.

The presently known manner of handling the realignment is simple: the VC4 fragments of the above example, which arrived at the destination point earlier (i.e., their frame No. 1 in a multiframe is detected earlier) are held in the buffer memory blocks of the respective paths until other VC4 fragments' "parallel" frames arrive to the realignment device along their respective paths. Reassembling is performed at the output of the different buffers.

However, if the delay difference between the VC4 streams, following along the parallel paths approaches and even exceeds a ½ cycle period (being ½ the length of the multiframe), the delay difference between the VC4 streams will become indistinguishable and the correct order will be lost.

In other words, with a given equipment at the destination point (the point of re-assembling fragments of the concatenated stream), the problem may become unsolvable at a particular moment when one or more of the parallel channels change their delay.

SUMMARY OF THE INVENTION

The synchronizing problem can therefore be defined as a problem of preserving the delay differences between fragments of the disassembled high rate stream within a tolerable range, which still enables recognition of the real delay difference and thus the proper reassembling of the fragments.

Further objects of the invention will become apparent as the description proceeds.

The proposed solution can be formulated both as a method and a device for solving the problem of delay equalization for the above-mentioned Inverse MUX technology, and in particular for virtual concatenated streams in SONET/SDH (lower order such as VC11-Nc, VC12-Nc, VC2-Nc, . . . Higher order, such as VC3-3c, VC3-12c, VC4-4c, VC4-16c, VC4-64c, . . . and the like).

In the frame of the present description, and regardless a particular technology (the Inverse MUX in general, or the virtual concatenated SDH/SONET streams in particular), the following terminology will be used:

a high rate initial data stream will be called a concatenated stream, each of the lower rate data streams obtained by disassembling the high rate initial one will be called a fragment (or a fragment data stream), and the obtained fragments transmitted over parallel channels will be called a virtual data stream.

In general, the proposed method provides gradual minimization of differential delay in a virtual data stream at one or more intermediate points between a source point and a destination point of said stream.

In other words, the proposed method for delay equalization of fragments of a virtual concatenated data stream comprises providing, between a source point and a destination point of the virtual stream, one or more intermediate devices for minimizing differential delay; said source point being a point of dismantling a concatenated data stream into said fragments and of simultaneously launching thereof onto respective parallel paths, and said destination point being a point of reassembling the fragments into the concatenated stream upon delay equalizing; the method thereby enabling the proper reassembling to be achieved at said destination point.

The proposed method preferably includes a step of grouping frames in the fragments' data streams into multiframes, each said multiframe comprising a pre-selected number of standard data frames, each standard data frame in the multiframe bearing its sequence number. For example, serial numbers of frames in the multiframe may be indicated in byte H4 of the POH of VC4, which byte serves a so-called multiframe counter.

As has been realized in the prior art, the correct sequence of fragments of the concatenated signal can still be restored, if the maximal delay difference between two received fragments does not exceed ½ of the cycle period $T_{cycle}$. (Wherein the $T_{cycle}$ is a time period, in frames, equal to the length of one multiframe). However, the known techniques applied that condition to the destination point of the virtual stream.

For ensuring the proper reassembling, the novel method proposes arranging said intermediate devices at such intermediate points between the source point and the destination point that, at each of the intermediate points and at the destination point, the maximal delay difference between any incoming pair of fragments does not exceed $\frac{1}{2}T_{cycle}$.

The method preferably comprises a step of adjusting each of the intermediate delay minimizing devices (devices for minimizing a differential delay between the fragments) to minimize or equalize delay differences between the fragments outgoing from said device.

According to one version of the method, it also comprises providing the destination point with a delay equalizing device similar to said intermediate devices.

The proposed method is advantageous in that it allows controlling and gradually minimizing the delay difference between different fragments when that delay difference is in progress. Owing to that, accumulation of drastic delay differences at the destination point is prevented.

According to the preferred version of the method, the concatenated data stream is a contiguous concatenated SDH/SONET data stream, and the virtual data stream is a virtual concatenated SDH/SONET data stream formed by disassembling said contiguous concatenated data stream into the fragments and transmitting them along separate paths.

For example, the contiguous concatenated signal VC4-4c can be transmitted via four individual paths in the form of a virtual VC4-4c, wherein each of the paths transmits one fragment VC4 signal. Analogously, 16 parallel paths can be used for transmitting a concatenated signal VC4-16c in the form of 16 fragment VC4 signals, 12 parallel paths—for transmitting a signal VC3-12c in the form of 12 fragment VC3 signals, and the like. However, other combinations are possible. If the fragments are not identical, a specific arrangement would be necessary for balancing differently sized frames of the fragment streams before the delay minimization/equalization.

The multiframe length is usually selected according to the maximal expected delay in transmission of the fragment data streams between the source point and the destination point. In the VC4 fragment, the multiframe may contain any number of frames, for example 8, 16, 256 frames. Consequently $T_{cycle}$ of the multiframe comprising 16 frames will be equal to 2 ms.

According to another aspect of the invention, there is provided a device for minimizing a differential delay in a virtual data stream, said virtual data stream being transmitted as a number of fragment data streams via respective individual paths; each of the fragment data streams being formed by continuously transmitted data frames; the device comprises a control unit and N memory buffer blocks, each to be fitted in a respective individual path; the device is adapted to be installed at an intermediate point between the source point and the destination point.

Preferably, the differential delay minimizing device serves all fragments of the virtual data stream. However, it is possible that the fragments are transmitted via wires (fibers) arranged in two or more different cables (bundles); if such cables are considerably spaced from one another, different groups of the fragments may be served by separate delay minimizing devices.

Capacity of each buffer memory block of the device can be estimated based on the maximal expected differential delay which might be introduced in the section of the virtual path served by the device for minimizing differential delay (actually, in any of said individual paths up to the device).

In the corresponding description of the method, such a device has been called the intermediate device.

According to one particular embodiment of the device, it is designed for equalizing delays in the virtual concatenated data stream in SONET/SDH.

In one preferred embodiment of the device, effective capacities of the buffer memory blocks are adjustable by the control unit to achieve such a ratio there-between, that the fragments incoming the device with particular delay differences be output therefrom with the reduced delay differences, i.e. minimal possible at that point. In the most preferred embodiment of the device, the minimal delay difference is zero, i.e. the fragment signals are output simultaneously and the device serves as a delays' equalizer.

Adjusting of the effective capacities can be provided automatically in real time.

The device for minimizing differential delays may be designed as a stand-alone element which can be switched into, say, the optical cable(s) via which the fragment data streams are transmitted. Alternatively, the device may form integral part of any network element which handles the fragment data streams between the source point and the destination point. In the latter case, operations of adding or removing one or more of such integrated intermediate devices will constitute just actuating or de-actuating the suitable function in one or more network elements switched between the source point and the destination point.

Since, according to the inventive method, the delay difference man be minimized on the way of the virtual data stream, and since any number of the intermediate devices can be introduced in the virtual transmission path as needed, the buffer memory blocks may have relatively small capacity.

The present invention also concerns a network element incorporating the above-described device for minimizing a differential delay.

According to yet a further aspect of the invention, there is provided a system for delay equalizing in a virtual data stream (as above, said virtual data stream being transmitted in the form of N fragments via respective individual paths between a source point and a destination point); the system comprising the following elements:

a source network element at a source point, capable of transforming a concatenated data stream into the virtual data stream, one or more delay devices installed between the source point and the destination point for minimizing delay differences in transmission of the N fragments via said individual paths, and a terminal network element at the destination point, capable of transforming the virtual stream back into the concatenated stream upon delay equalization.

In the most preferred embodiment of the system, said device for minimizing differential delay is the intermediate device according to one of the aspects of the invention.

The terminal network element is usually also provided with its own delay equalizing device, though the capacity of such a device may be as modest as that of the intermediate devices. Therefore, the term "devices for minimizing differential delay" includes the device at the terminal network element and any of the intermediate devices.

In the above-described system, positions of said one or more devices for minimizing differential delay are selected so that the maximal delay difference between any two fragments incoming any of the devices does not exceed ½$T_{cycle}$.

The total capacity of the buffer memory blocks utilized in said delay minimizing and equalizing devices along a particular path can be estimated based on the expected delay in this path, and is usually selected to slightly exceed the estimated delay.

In the most preferred embodiment of the system, the number of said intermediate devices and characteristics thereof are adjustable.

The system is preferably designed for handling virtual concatenated data streams in SONET/SDH.

Finally, a set of equipment for gradual minimization of a differential delay in a virtual data stream, comprising one or more above-defined device(s) for minimizing a differential delay, is also considered an aspect of the invention. The set may additionally include a suitable source network element, and/or a suitable destination network element. The set may specifically be designed for handling one or more SDH/SONET concatenated virtual stream(s).

It is therefore understood that the problem of proper re-assembling will never become unsolvable when using the inventive method, system and device: any expected or unexpected change of delay conditions in a path could easily be compensated by inserting one or more of the described intermediate devices. It is also understood, that the profit is bought by introducing an additional slight delay at each of the intermediate devices and, consequently, an additional (but synchronous) delay in the total path of the virtual stream.

BRIEF DESCRIPTION OF THE DRAWINGS

The present invention will be further described in more detail using a non-limiting example of one SDH concatenated data stream and with reference to a number of drawings in which.

DETAILED DESCRIPTION OF THE PREFERRED EMBODIMENTS.

Figure 1:
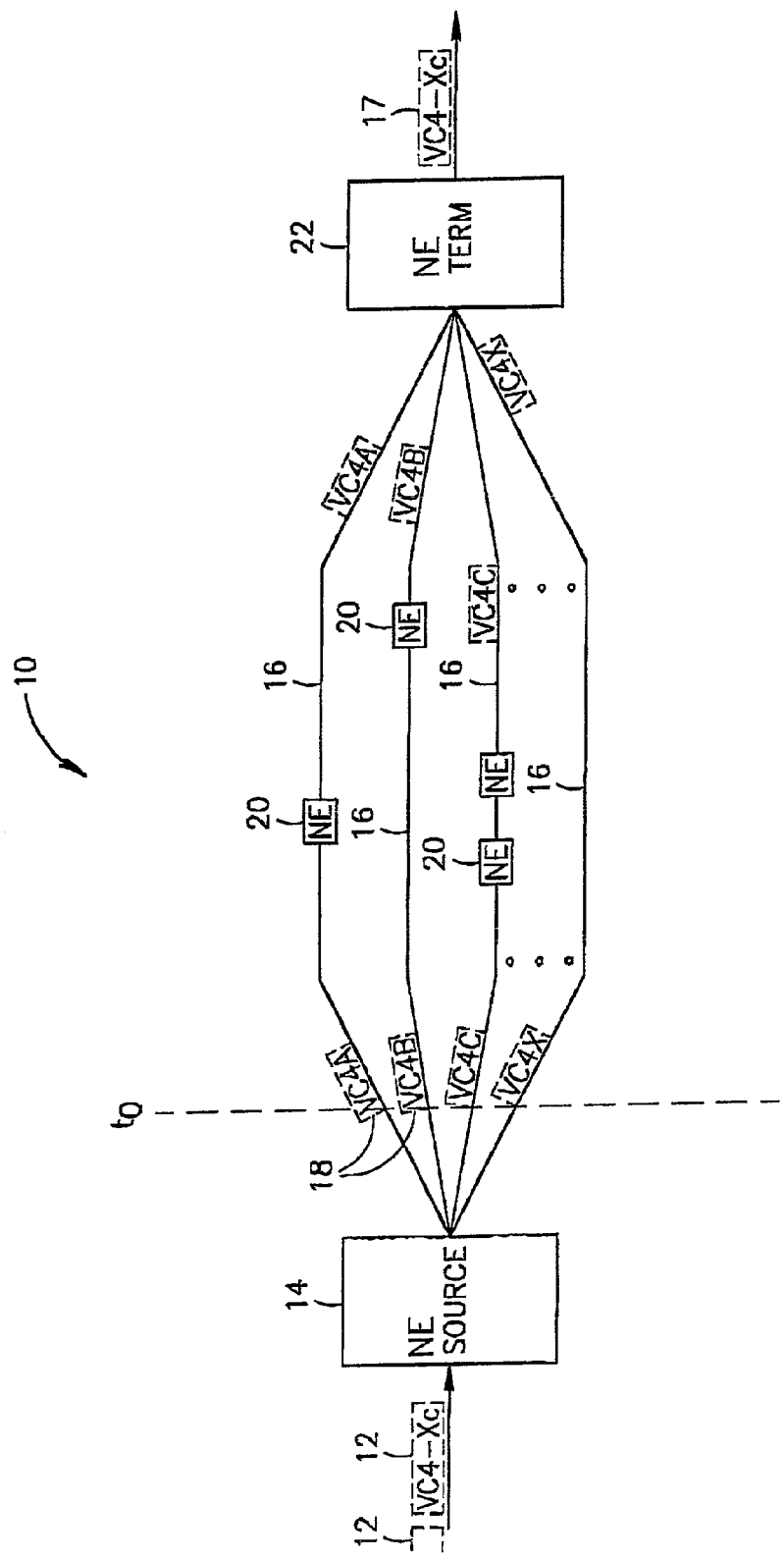
FIG. 1 illustrates a schematic block-diagram of transmitting a contiguous concatenated data stream via a network, using the form of a virtual concatenated stream.

FIG. 1 illustrates a prior art arrangement, where a contiguous concatenated data stream (VC4-Xc in this particular embodiment) is transmitted via a telecommunication network 10 in the form of virtual concatenated data stream VC4-X, for example through a number of optical fibers typically disposed in one cable. It should be appreciated that another concatenated data stream (belonging to SONET and/or SDH) could be illustrated in this drawing. On the way, the cable may be split, reunite again, but at the destination point the fibers must meet together. The initial concatenated signal, which is schematically depicted as a sequence of long dotted contours 12, is transformed into a virtual form by a so-called source network element 14, so that "X" fragment signals are simultaneously launched onto "x" respective individual paths 16 and then transmitted there-along. The fragment signals (VC4A, VC4B, VC4C ... VC4X) produced from the concatenated signal 12, are schematically illustrated as "x" smaller dotted contours 18. Since the drawing should be understood as illustrating a generalized virtual concatenated data stream, the long dotted contours 12 may, for example, symbolize a SONET concatenated signal VC3-12c (or AU3-12c), and the "x" smaller dotted contours 18—the fragment signals which may be twelve signals VC3 (AU3) or four signals VC3-3c (AU3-3c).

Since the individual paths 16 comprise different number of network elements 20, they are characterized by different delay times and thus the fragment signals 18 arrive to a terminal network element 22 with delay differences with respect to one another. For example, the VC4X signal arrives first since its individual path does not comprise any intermediate network elements, VC4A and VC4B arrive together slightly later, and VC4C has the greatest delay. The network element (NE) 22 is responsible for re-assembling the signal 17 from the received fragments. For aligning the fragment signals, NE 22 is usually equipped with a buffer memory block (not shown) for each individual path to allow delaying one or more fragments which come "early" till the remaining fragments of the initial signal arrive. However, the problem is to align the fragments with the correct periodicity. The problem will become apparent from the illustration in FIG. 2.

Figure 2:
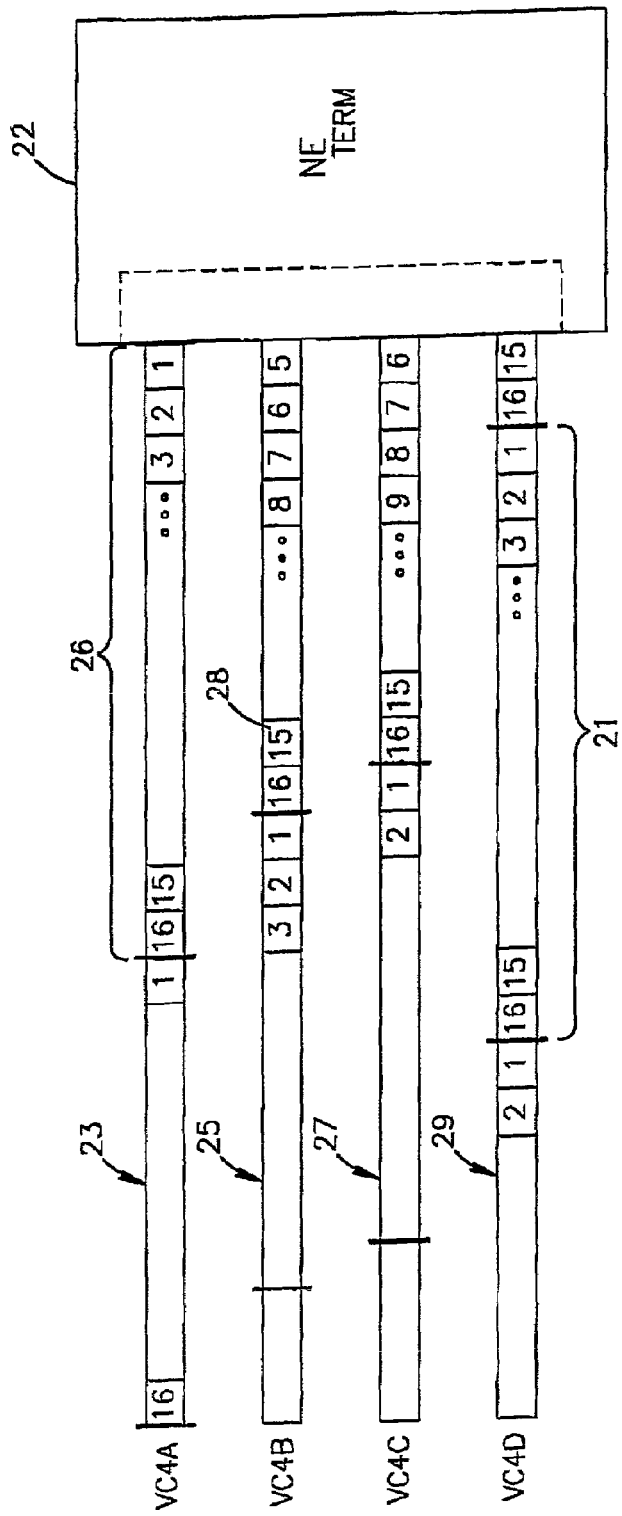
FIG. 2 schematically illustrates fragments of the virtual concatenated data stream, continuously transmitted by multiframes via individual paths in the network.

In FIG. 2, the above example of a virtual concatenated signal VC4-4 is illustrated in the form of four channels 23, 25, 27 and 29 via which continuously follow respective fragment signals VC4A, VC4B, VC4C and VC4D, grouped in multiframes. In this particular example, one multiframe (marked 26) of any fragment VC4 comprises 16 frames(a frame is marked 28). We keep in mind, that all the fragments are simultaneously launched at the source element, i.e., their first multiframes have been transmitted simultaneously. Suppose, the terminal network element 22 now receives frames from all the four channels, and they arrive in the order illustrated in the drawing (due to different delays in the channels). The NE 22 must align the received frames in the four fragments, i.e. to find four mate frames arriving via four respective channels and belonging to "parallel" multiframes (those which have been simultaneously launched). But where are the "parallel" frames of the first complete multiframe (marked 21) which has been received via the channel 29 transmitting the fragment VC4D? Whether they are positioned (on the time axis) before or after the multiframe 21? One may note that multiframes arriving along the channel 27, form with those of the channel 29 the delay difference exactly equal to $\frac{1}{2}T_{cycle}$, which is quite puzzling from the point of view of proper alignment (remember that $T_{cycle}$ is the length of the multiframe). It is therefore quite understood that if the delay difference between any two fragments of the same initial signal is equal to or exceeds $\frac{1}{2}T_{cycle}$, the proper alignment becomes impossible, regardless any buffer memory means which might be available in the NE 22.

Figure 3:
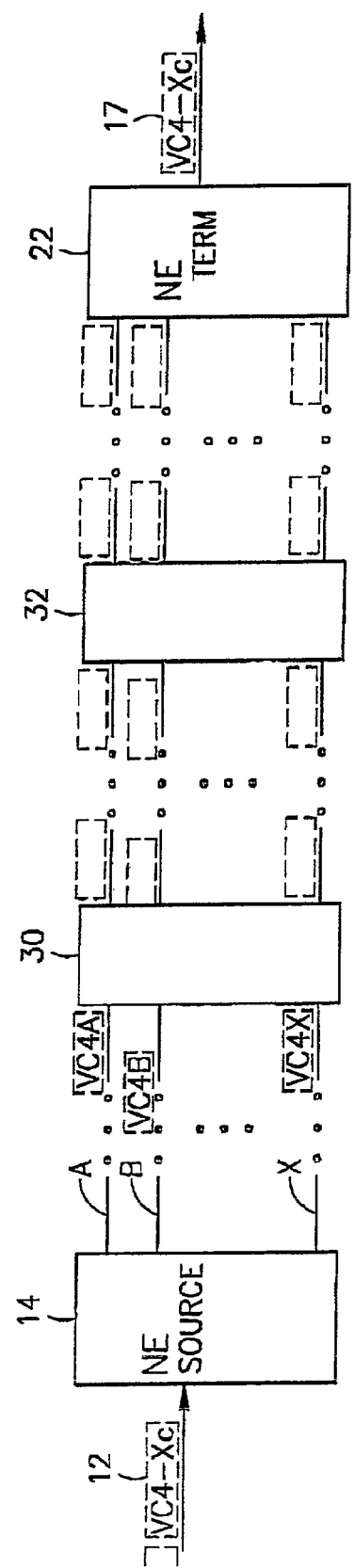
FIG. 3 is a schematic block-diagram illustrating the inventive method and system.

FIG. 3 schematically illustrates the proposed inventive concept with the aid of a block-diagram of an exemplary system. Suppose, the same source network element 14 dismantles the same initial contiguous concatenated signal 12 (the exemplary, non-limiting VC4-Xc) into the virtual form, i.e. into fragments VC4A, VC4B, . . . VC4X which are simultaneously launched by NE 14 onto "X" respective individual lines A,B, . . . X. Outgoing frames of each of the fragments are numbered sequentially by the source network element 14; preferably, they are also grouped in multiframes having the length $T_{cycle}$. Suppose that line A is characterized by the smallest delay and line B by the greatest delay, so that, if no measures are taken, the respective fragments of the initial signal 12 will arrive to a terminal network element 22 with a delay difference exceeding $\frac{1}{2}T_{cycle}$. For preventing the sequence loss at the destination device, intermediate delay minimizing devices are provided along the path of the virtual concatenated signal: two devices 30 and 32 are shown. Each of them takes care of a portion of the total delay difference, namely of the delay accumulated up to that particular device. Mutual positions of the devices 30, 32, . . . in the system can be selected so as to ensure that delay differences of the incoming component signals never exceed the threshold value $\frac{1}{2}T_{cycle}$. As a result, the total delay difference will never reach the degree it would have without the gradual delay minimization and, most important, will never exceed the value when the proper alignment becomes impossible. Moreover, any changes in the lines' conditions can be easily compensated by inserting (removing) one or more intermediate device, and/or by adjusting delays introduced by the intermediate devices 30 (32) to one or another line of the component signals.

If required, the devices 30 and 32 may handle different groups of the fragments, for example the device 30 can be connected to path A and B, and the device 32—to the remaining paths. The final delay equalization will be provided at the terminal network element 22. The devices 30 and 32 may constitute stand-alone devices. However, any one of them may be incorporated in a network element having its basic functions, thus turning this network element capable of performing the additional function of differential delay minimization.

Figure 4A:
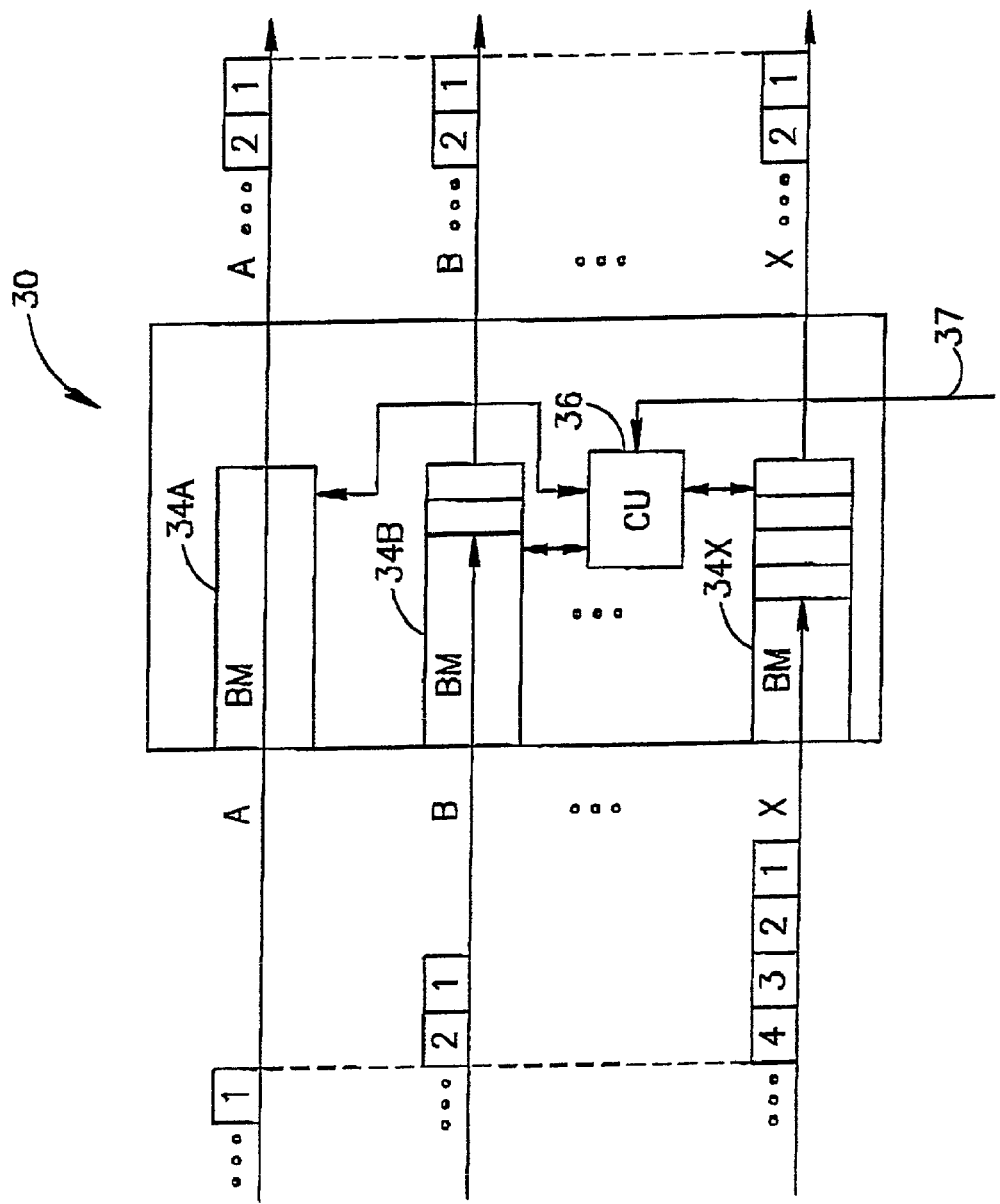
FIG. 4a is a schematic block-diagram of a delay-equalizing device according to the invention.
Figure 4B:
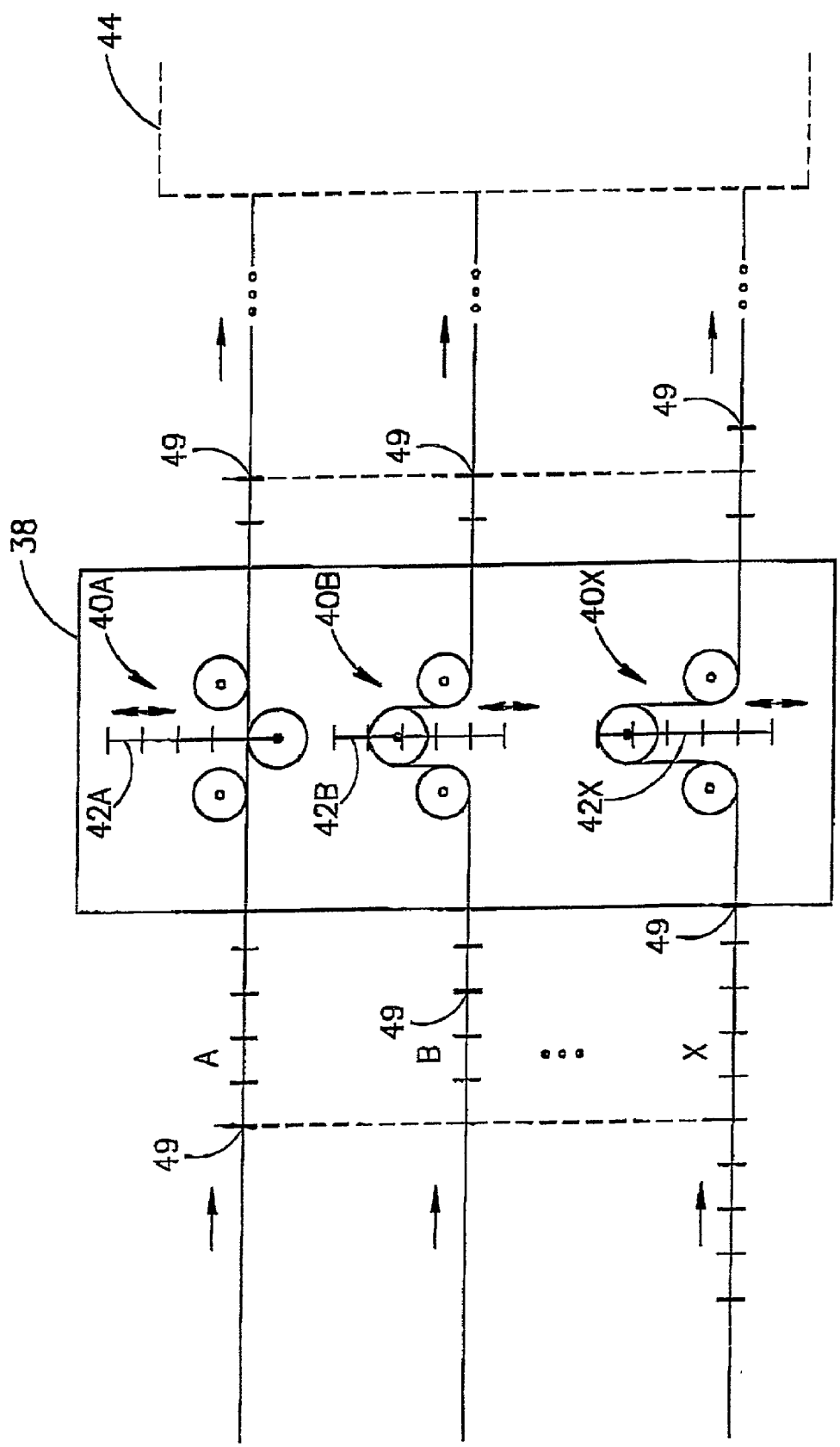
FIG. 4b is a model for explaining the principle of the invention.

FIG. 4a illustrates a block-diagram of a single differential delay minimizing device 30, while FIG. 4b demonstrates its comprehensive model. The device comprises "x" buffer memory (BM) blocks 34A, 34B, . . . 34X receiving the incoming fragments arriving along lines A, B, . . . x in the form of multiframe sequences. Capacity of the buffer blocks is designed based on the expected delay in the network. However, effective capacity of each of the buffer blocks can be adjusted via a control unit 36 which preferably performs the control in real time. Actuating and de-actuating of the device is provided by the outside command 37. For example, the synchronously launched fragments arrive to the device 30 so, that multiframes in path x are four frames ahead the multiframes in path A and two frames ahead the multiframes in path B. (The count/storing unit may be different, for example one byte.) Therefore, the effective capacity of the block 34A is shown reduced to zero with respect to the maximally allowed, while the capacity of block 34B is two frames and that of block 34X is four frames. It can be seen that multiframes of the different paths leave the delay minimizing device synchronously, so the device actually performs the delay equalization. In general, an intermediate device for differential delay minimization must at least reduce delay differences between the fragment data streams.

The model in FIG. 4b illustrates threads A,B . . . X moving toward a delay minimizing module 38. The threads, however, are fed to the module with their scale marks 49 being non-aligned. The module comprises "x" pulley systems, where positions of pulleys 40A, 40B . . . 40X are adjustable. By selecting position of these pulleys along their vertical tracks 42A, 42B, . . . 42X, some of the threads can be caused to pass a longer way inside the module, which results in minimizing the "delay differences" of the threads at the output of the module, i.e. in achieving almost synchronous movement of their scale marks. For ensuring better alignment, the threads should arrive to the module with a smaller delay difference, and the tracks' lengths must be adjusted accordingly. However, the slight discrepancy may be overcome at a next device 44 similar to 38, if no additional delays accumulate on the way thus causing more such device(s) to be inserted or parameters of the devices to be adjusted.

The invention therefore provides decentralized treatment of the delay equalization in a virtual data stream (i.e., along the path consisting of "x" parallel paths transmitting fragments of the disassembled concatenated stream).

Though the invention has been described based on specific examples and embodiments, it should be appreciated that other data streams can be handled, and other implementations of the differential delay minimizing device might be used according to the general concept of the invention.

The invention claimed is:

1. A method for gradual minimization of differential delay between fragment data streams transmitted via individual paths and forming a virtual data stream between a source point and a destination point; wherein said source point being a point of dismantling a concatenated data stream into said fragment data streams and of launching thereof in parallel onto respective individual paths to form the virtual data stream, and said destination point being a point of reassembling the fragment data streams transmitted over said individual paths into the concatenated data stream; said virtual data stream and each of said fragment data streams consisting of data frames;

the method comprises:

providing, at one or more intermediate points between the source point and the destination point, one or more intermediate devices for gradually minimizing differential delay;

grouping the data frames of the fragment data streams into multiframes, each said multiframe comprising a constant number of the data frames, each data frame in the multiframe bearing its sequence number;

arranging said intermediate devices at such intermediate points between the source point and the destination point that, at each of the intermediate points and at the destination point, the maximal delay difference between any incoming pair of the fragment data streams does not exceed $\frac{1}{2}T_{cycle}$, wherein $T_{cycle}$ is the multiframe length measured in time.

2. The method according to claim 1, further comprising adjusting each of the intermediate devices to minimize or equalize delay differences between the fragment data streams outgoing from said device, wherein said outgoing fragment data streams form at least a sub-plurality of a total number of the fragment data streams.

3. The method according to claim 1, including providing the destination point with a delay equalizing device identical to said intermediate devices.

4. The method according to claim 1, wherein the concatenated data stream is a contiguous concatenated SDH/SONET data stream of any standard rate, and the virtual data stream is a virtual concatenated SDH/SONET data stream formed by disassembling the contiguous concatenated data stream into said fragment data streams being SDH/SONET data streams having standard rates lower than that of said contiguous concatenated stream.

5. A device for gradually minimizing differential delay in a virtual data stream comprising N fragment data streams, wherein said fragment data streams being transmitted via respective N individual paths between a source point and a destination point and wherein each of said fragment data streams are formed by continuously transmitted data frames;

the device comprising at least two memory buffer blocks and a control unit controlling operation of the buffer memory blocks, the device is adapted to be fitted at an intermediate point between the source point and the destination point, each of said at least two memory buffer blocks is suitable to be associated with a corresponding individual path of said N paths, effective capacities of the buffer memory blocks are adjustable by the control unit to achieve such a ratio therebetween, that the fragment data streams incoming the device with delay differences be output therefrom with minimal possible delay differences, so that when fitted at the intermediate point, the device is capable of minimizing differential delay between at least two fragment data streams transmitted via the individual paths respectively associated with said at least two memory buffer blocks.

6. The device according to claim 5, wherein capacity of the buffer memory blocks is selected based on the maximal expected delay which might be introduced in any of said individual paths at a particular section served by the delay minimizing device.

7. The device according to claim 5, being designed for minimizing differential delays in SONET/SDH, wherein the virtual data stream is a virtual concatenated SDH/SONET data stream formed by disassembling a contiguous concatenated data stream into said fragment data streams being SDH/SONET data streams having standard rates lower than that of said contiguous concatenated stream.

8. The device according to claim 5, designed as a standalone element adapted to be switched between two or more lines intended for transmitting said fragment data streams.

9. The device according to claim 5, forming integral part of a network element positioned between the source point and the destination point and suitable for parallel handling said at least two fragment data streams.

10. A network element, incorporating the device according to claim 5, positioned between the source point and the destination point and suitable for parallel handling said at least two fragment data streams.

11. A set of equipment for gradual minimization of differential delay in a virtual data stream, comprising at least one device for minimizing differential delay according to claim 5.

12. The set of equipment according to claim 11, further comprising a source network element capable of transforming a concatenated data stream into a virtual data stream.

13. The set of equipment according to claim 11, further comprising a destination network element provided with a delay equalizing device.

14. The set of equipment according to claim 11, wherein said delay equalizing device is identical to said device for minimizing differential delay.

15. The set of equipment according to claim 11, specifically designed for handling an SDH/SONET concatenated virtual stream.

16. A system for delay equalizing of N fragment data streams in a virtual data stream, said virtual data stream being formed by a number of fragment data streams transmitted via respective individual paths between a source point and a destination point; the system comprising:
   a source network element at the source point, capable of transforming a concatenated data stream into the virtual data stream,
   one or more intermediate devices between the source point and the destination point for gradual minimizing delay differences in transmission of at least two of said N fragment data streams via the respective individual paths, and
   a terminal network element at the destination point, capable of transforming the virtual data stream back into the concatenated data stream after delay equalizing,
   wherein each of said data streams consists of consequently transmitted data frames, and in each of said N fragment data streams the data frames are grouped in multiframes containing a constant number of the data frames,
   and wherein positions of the intermediate devices are selected so that the maximal delay difference between any two fragment data streams incoming any of said devices does not exceed $\frac{1}{2}T_{cycle}$, where $T_{cycle}$ is the multiframe length measured in time.

17. The system according to claim 16, wherein the terminal network element is provided with a delay equalizing device equivalent to said intermediate device.

18. The system according to claim 16, wherein the total capacity of the buffer memory blocks utilized in all the devices for minimizing differential delay along a particular path is selected to slightly exceed an expected delay which might be introduced in said path.

19. The system according to claim 16, specifically designed for handling virtual data streams in SONET/SDH, wherein the virtual data stream is a virtual concatenated SDH/SONET data stream formed by disassembling a contiguous concatenated data stream into said fragment data streams being SDH/SONET data streams having standard rates lower than that of said contiguous concatenated stream.

20. The system according to claim 16, wherein said at least one intermediate device is a device for gradually minimizing differential delay in a virtual data stream comprising N fragment data streams, wherein said fragment data streams are transmitted via respective N individual paths between a source point and a destination port and wherein each of said fragment data streams are formed by continuously transmitted data frames the device comprising at least two memory buffer blocks and a control unit controlling operation of the buffer blocks, the device being adapted to be fitted at an intermediate point between the source point and the destination point, each of said at least two memory buffer blocks being suitable to be associated with a corresponding individual path of said N paths, so that when fitted at the intermediate point, the device is capable of minimizing differential delay between at least two fragment data streams transmitted via the individual paths respectively associated with said at least two memory buffer blocks.

21. A method for gradual minimization of differential delay between a number of fragment data streams transmitted via individual paths and forming a virtual data stream, wherein said virtual data stream and each of said fragment data streams consisting of data frames,
   the method comprises:
   inserting one or more intermediate devices at one or more respective intermediate points between a source point and a destination point of said virtual data stream,
   wherein each of said intermediate devices being intended for receiving N of said fragment data streams arriving directly or indirectly from the source point via respective N individual paths, reducing differential delay between at least some of said N fragment data streams and, thereupon, forwarding the N fragment data streams towards said destination point via the respective N individual paths.

22. A device for gradually minimizing differential delay between N fragment data streams of a virtual data stream comprising at least N fragment data streams, wherein said N fragment data streams are transmitted via respective N individual paths between a source point and a destination point and wherein each of said N fragment data streams are formed by continuously transmitted data frames; the device comprising
   N memory buffer blocks and a control unit controlling operation of the memory buffer blocks, the device is adapted to be fitted at an intermediate point between the source point and the destination point, each of said N memory buffer blocks is suitable to be associated with a corresponding individual path of said N paths, so that when fitted at the intermediate point, the device is capable of
   receiving N said fragment data streams arriving directly or indirectly from the source point via the respective N individual paths, reducing differential delay between at least some of said N fragment data streams and, thereupon, forwarding said N fragment data streams towards the destination point via the respective N individual paths.

* * * * *